United States Patent [19]

Hayano

[11] Patent Number: 4,984,851

[45] Date of Patent: Jan. 15, 1991

[54] WHEEL COVER FOR AUTOMOBILES

[75] Inventor: Koichiro Hayano, Yokohama, Japan

[73] Assignee: Hashimoto Forming Industry Co., Ltd., Yokohama, Japan

[21] Appl. No.: 425,877

[22] Filed: Oct. 24, 1989

[30] Foreign Application Priority Data

Oct. 31, 1988 [JP] Japan .................. 63-142385[U]

[51] Int. Cl.⁵ .................................................. B60B 7/02
[52] U.S. Cl. .................................. 301/37 P; 301/37 R
[58] Field of Search .............. 301/37 R, 37 P, 37 TP, 301/37 PB, 37 B; 264/328.9, 572

[56] References Cited

U.S. PATENT DOCUMENTS 3,252,738  5/1966  Huntley .................. 301/37 P
3,481,652 12/1969  Mazerolle ............... 301/37 CM
4,234,642 11/1980  Olabisi ................... 264/572 X
4,601,870  7/1986  Sasaki .................... 264/572

FOREIGN PATENT DOCUMENTS 2327873  5/1977  France .
2052404  1/1981  United Kingdom .

Primary Examiner—Russell D. Stormer
Attorney, Agent, or Firm—Stevens, Davis, Miller & Mosher

[57] ABSTRACT

A wheel cover for automobiles includes a main body which is composed of a thermoplastic synthetic resin material, and which is integrally provided on its rear surface with a plurality of reinforcing ribs projecting rearwardly of the main body. At least one of the reinforcing ribs has a hollow bottom portion adjacent to the rear surface of the main body, having a width which is greater than the thickness of the main body. The ribs with the hollow bottom portion serve to realize satisfactory rigidity and impact resistance of the wheel cover, without accompanying formation of undesirable sink mark on the front surface of the main body to deteriorate the appearance.

8 Claims, 1 Drawing Sheet

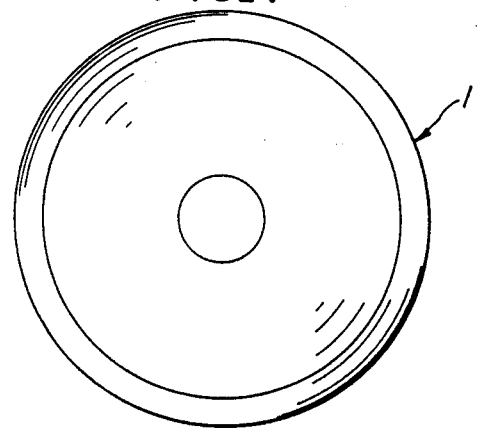
FIG._1
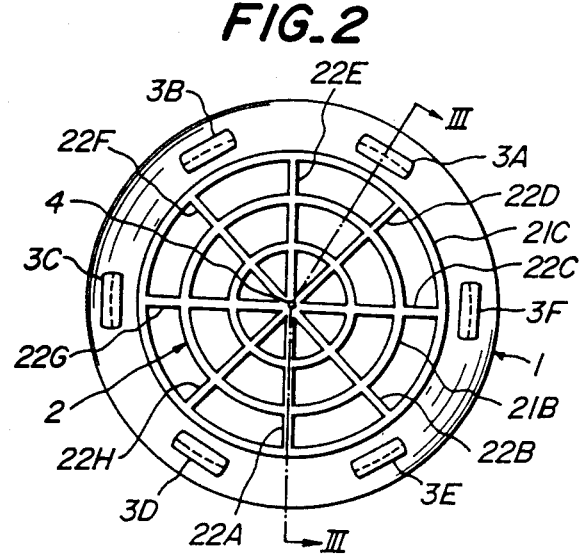
FIG._2
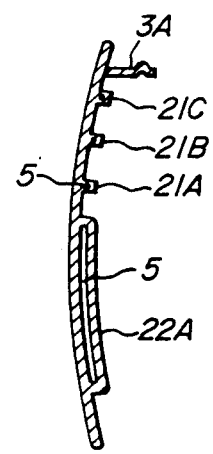
FIG._3
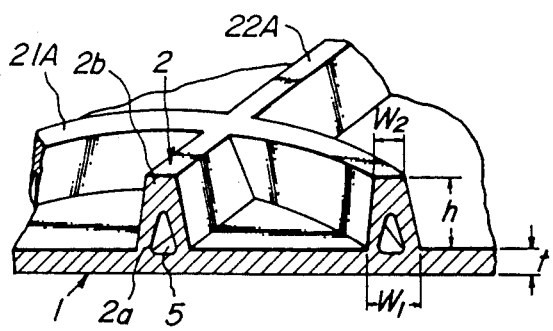
FIG._4

WHEEL COVER FOR AUTOMOBILES

BACKGROUND OF THE INVENTION

1. Field of the Invention

The present invention relates to a wheel cover for automobiles, including a substantially dish-like main body which is composed of a thermoplastic synthetic resin material.

2. Description of the Related Art

Wheel covers for automobiles are often subjected to severe impact forces, particularly when struck by pebbles during driving on unpaved road. Thus, in order to realize wheel covers with improved rigidity and impact resistance, the main body of the wheel cover is generally provided on its rear surface with a plurality of reinforcing ribs formed integrally with and projecting axially rearwardly from the main body.

It is well known in the art that higher rigidity and impact resistance of the wheel cover can be achieved by increasing the section modulus of the reinforcing ribs, e.g. by increasing the width of the rib at its bottom portion adjacent to the rear surface of the main body. On the other hand, however, provision of the reinforcing ribs with an increased width of the bottom portion suffers from serious problems. Among others, due to a relatively uneven distribution of the molten synthetic resin material in an injection mold cavity in which the wheel cover is molded, an undesirable sink mark tends to appear on the front surface of the wheel cover as being clearly visible from outside, thereby significantly deteriorating the appearance of the product. Consequently, the width of the bottom portion of the reinforcing ribs in known wheel covers is generally limited to be within a range of approximately ⅜ to ½ of the thickness of the wheel cover main body, with a result that it is difficult to achieve a sufficient reinforcement of the wheel cover main body.

SUMMARY OF THE INVENTION

Therefore, it is a primary object of the present invention to provide a novel wheel cover which is capable of eliminating the above-mentioned drawback of the prior art.

The present invention is to make it possible to realize satisfactory rigidity and impact resistance of the wheel cover by means of relatively wide reinforcing ribs which can be formed on the rear surface of the main body without accompanying undesirable formation of a sink mark on the front surface of the main body.

To this end, according to the present invention, there is provided a wheel cover for automobiles, comprising a substantially dish-like main body which is composed of a thermoplastic synthetic resin material, said main body having axial front and rear surfaces and a thickness measured therebetween, said rear surface having reinforcing ribs formed integrally with and projecting axially rearwardly from said main body, at least one of said reinforcing ribs having a bottom portion adjacent to said rear surface of the main body, said bottom portion being of a hollow cross-section and having a width which is greater than said thickness of the main body.

With the above-mentioned arrangement of the wheel cover according to the present invention, each reinforcing rib on the rear surface of the wheel cover main body has a hollow bottom portion adjacent to the rear surface of the main body, whose width is greater than the thickness of the main body. The relatively wide reinforcing rib has a relatively high modulus of section, and thus serves to realize satisfactory rigidity and impact resistance of the wheel cover. Moreover, the relatively wide reinforcing ribs can be formed on the rear surface of the main body without accompanying undesirable sink mark on the front surface of the main body. This is due to the fact that the hollow space within the rib adjacent to the rear surface of the main body effectively prevents the front surface region of the main body from being subjected to an excessive shrinkage stress upon hardening of the resin material which has been injected into the mold in its molten state.

BRIEF DESCRIPTION OF THE DRAWINGS

FIG. 1 is a front view of a wheel cover according to one embodiment of the present invention;

FIG. 2 is a rear view of the wheel cover shown in FIG. 1;

FIG. 3 is a sectional view of the wheel cover taken along the line III—III of FIG. 2; and FIG. 4 is a partly broken fragmentary perspective view of the reinforcing ribs.

DETAILED EXPLANATION OF THE PREFERRED EMBODIMENT

The present invention will now be explained in further detail, by referring to one preferred embodiment shown in FIGS. 1 to 4.

The wheel cover according to the present invention includes a substantially dish-like main body 1, which may be composed of an appropriate thermoplastic synthetic resin material, such as ABS resin, polyamide resin and polypropylene resin. The main body 1 can be manufactured by an injection molding process, which is known per se. As shown in FIG. 1, the main body 1 has a substantially flat front surface which may be applied with a desired surface treatment, e.g. formation of a painted or plated layer of desired color and/or ornamental pattern, if necessary. The main body 1 has a thickness t as measured between the front and rear surfaces, which is typically within a range of 3.5 to 2.0 mm, and which is substantially constant at any location of the main body 1.

The main body 1 is integrally provided, on its rear surface, with a plurality of reinforcing ribs 2 to be particularly described hereinafter, and also with a plurality of resilient hook-like projections 3A, 3B, 3C, 3D, 3E and 3F which are spaced from each other by a predetermined angular distance. These projections 3A to 3F are adapted to be resiliently deflected radially inwardly, so as to be engaged with a groove formed in a radially inner surface of a road wheel rim, not shown.

The reinforcing ribs 2 on the rear surface of the main body 1 includes, as shown in FIG. 2, a plurality of circumferential ribs 21A, 21B and 21C arranged concentrically with each other, and a plurality of radial ribs 22A, 22B, 22C, 22D, 22E, 22F, 22G and 22H extending radially outwardly from the center 4 of the main body 1 at a substantially equiangular distance from each other. These ribs 21A to 21C; 22A to 22H are integrally connected with each other at their cross points.

Each rib 2 has a bottom portion 2a adjacent to the rear surface of the main body 1, which is of hollow cross-section with its interior space 5 extending throughout the entire length of the rib 2. Preferably, these interior spaces 5 are in communication with each other. The bottom portion 2a of each rib 2 has a width $W_1$ which is greater than the thickness t of the main body 1. As one example, for a wheel cover main body 1 with a thickness t of approximately 3.0 mm, the width $W_1$ of the bottom portion 2a of each rib 2 is approximately 5.0 to 3.5 mm. Each rib 2 has a free end 2b which is remote from the rear surface of the main body 1. The free end 2b of the rib 2 has a width $W_2$ which is smaller than the width $W_1$, and which preferably is substantially same as, or slightly smaller than the thickness t of the main body 1. Each rib 2 has a projection length h which is approximately three times of the thickness t of the main body 1.

The above-mentioned structure of the wheel cover according to the present invention can be readily manufactured by an injection molding process, using a mold (not shown) with an injection gate at a location corresponding to the center 4 of the rear surface of the wheel cover main body 1. A predetermined amount of an appropriate thermoplastic synthetic resin material in its molten state is injected into the mold cavity through the gate. The amount of the resin material to be injected into the mold is smaller than the total volume of the cavity space in the mold.

While the resin material injected into the mold is still in the molten state, pressurized gas is injected into the resin material through the gate of the mold. The gas consists preferably of a chemically inert gas, such as nitrogen, argon or helium gas. The inert gas injected into the resin material flows along an interior region of the resin material with a greater width, i.e. along the interior region corresponding to the base portion 2a of the reinforcing ribs 2. This is due to the fact that the interior region of the resin material with a smaller width exerts a greater flow resistance to the inert gas injected into the resin material, as compared with the interior region with a greater width.

It is thus possible to form the hollow interior space 5 in the base portion 2a of each rib 2. The cross-sectional size of the interior space 5 within the reinforcing rib 2 can be adjusted by controlling the amount of the resin material to be injected into the mold.

The supply of the inert gas is stopped when the pressure of the inert gas within the resin material reaches the supply pressure of the gas, or when the inert gas exerts a constant surface pressure to any location of the resin material. The resin material in the mole is then subjected to cooling and hardening.

Although the rib 2 has a bottom portion 2a with a width $W_1$ which is greater than the thickness t of the wheel cover main body 1, the presence of an interior space 5 within each rib 2 serves to significantly reduce the substantial material thickness of the base portion 2a, thereby to mitigate an uneven material distribution in the mold cavity. Consequently, it is possible to realize a wheel cover with an excellent appearance, by positively protecting the front surface of the main body 1 from a severe shrinkage stress upon hardening of the resin material, and from a resultant formation of undesirable sink mark on the front surface of the main body 1.

Moreover, a relatively wide base portion 2a of the reinforcing rib 2 in the wheel cover according to the present invention effectively realizes satisfactory rigidity and impact resistance of the wheel cover, and also achieves a relatively light structure due to the presence of the hollow interior space 5.

It is of course that the present invention is not limited to the above-mentioned embodiment, which has been presented by way of example only, and a number of variations and modifications may be made without departing from the scope of the invention.

What is claimed is:

1. A wheel cover for automobiles, comprising a substantially dish-like main body which is composed of a thermoplastic synthetic resin material, said main body having axial front and rear surfaces and a thickness measured therebetween, said rear surface having reinforcing ribs formed integrally with and projecting axially rearwardly from said main body, at least one of said reinforcing ribs having a bottom portion adjacent to said rear surface of the main body, said bottom portion having means for preventing a sink mark on said front surface of said wheel cover, said means comprising a hollow cross-section and having a width which is greater than said thickness of the main body.

2. The wheel cover as claimed in claim 1, wherein said reinforcing ribs are formed on said rear surface of the main body to extend radially outwardly of the main body at a substantially equiangular distance from each other.

3. The wheel cover as claimed in claim 2, wherein said at least one reinforcing rib has a free end portion on the axially rear side of the main body, said free end portion having a width which is smaller than that of said bottom portion.

4. The wheel cover as claimed in claim 1, wherein said reinforcing ribs are formed on said rear surface of the main body concentrically with each other.

5. The wheel cover as claimed in claim 4, wherein said at least one reinforcing rib has a free end portion on the axially rear side of the main body, said free end portion having a width which is smaller than that of said bottom portion.

6. The wheel cover as claimed in claim 1, wherein said reinforcing ribs comprises first ribs formed on said rear surface of the main body to extend radially outwardly of the main body at a substantially equiangular distance from each other, and second ribs formed on said rear surface of the main body concentrically with each other said first and second ribs being integrally connected with each other at their cross points.

7. The wheel cover as claimed in claim 6, wherein said at least reinforcing rib has a free end portion on the axially rear side of the main body, said free end portion having a width which is smaller than that of said bottom portion.

8. The wheel cover as claimed in claim 1, wherein said at least one reinforcing rib has a free end portion on the axially rear side of the main body, said free end portion having a width which is smaller than that of said bottom portion.

* * * * *